United States Patent [19]
Krebs et al.

[11] Patent Number: 6,015,583
[45] Date of Patent: Jan. 18, 2000

[54] DUAL WEB PACKAGE HAVING LABELING MEANS

[75] Inventors: Arthur T. Krebs; H. Walker Stockley, both of Spartanburg, S.C.

[73] Assignee: Cryovac, Inc., Duncan, S.C.

[21] Appl. No.: 08/670,859

[22] Filed: Jun. 28, 1996

[51] Int. Cl.[7] .................................................. A23B 55/00
[52] U.S. Cl. ......................... 426/396; 426/383; 426/129; 426/124; 426/127
[58] Field of Search ................................... 426/383, 129; 770/359

[56] References Cited

U.S. PATENT DOCUMENTS

| | | | |
|---|---|---|---|
| 2,260,064 | 10/1941 | Stokes | 93/3 |
| 2,623,826 | 12/1952 | Grinstead | 99/174 |
| 2,925,346 | 2/1960 | Harper et al. | 99/174 |
| 3,360,382 | 12/1967 | Miller | 99/174 |
| 3,561,668 | 2/1971 | Bergstrom | 229/43 |
| 3,574,642 | 4/1971 | Weinke | 99/174 |
| 3,681,092 | 8/1972 | Titchenal | 99/174 |
| 3,713,849 | 1/1973 | Grindrod et al. | 99/174 |
| 3,783,089 | 1/1974 | Hurst et al. | 161/166 |
| 4,055,672 | 10/1977 | Hirsch et al. | 426/127 |
| 4,438,850 | 3/1984 | Kahn | 206/634 |
| 4,522,835 | 6/1985 | Woodruff et al. | 426/264 |
| 4,840,271 | 6/1989 | Garwood | 206/213 |
| 4,847,148 | 7/1989 | Schirmer | 428/332 |
| 4,886,690 | 12/1989 | Davis et al. | 428/36 |
| 4,889,731 | 12/1989 | Williams, Jr. | 426/106 |
| 4,901,505 | 2/1990 | Williams, Jr. | 53/412 |
| 4,910,033 | 3/1990 | Bekele et al. | 426/129 |
| 5,226,531 | 7/1993 | Garwood | 206/213 |
| 5,271,642 | 12/1993 | Jahier et al. | 283/81 |
| 5,348,752 | 9/1994 | Gorlich | 426/129 |
| 5,419,096 | 5/1995 | Gorlich | 53/432 |
| 5,419,097 | 5/1995 | Gorlich et al. | 53/432 |
| 5,439,132 | 8/1995 | Gorlich | 220/359 |

FOREIGN PATENT DOCUMENTS 2251540 7/1992 United Kingdom .

*Primary Examiner*—Laurie Scheiner
*Assistant Examiner*—J. S. Parkin
*Attorney, Agent, or Firm*—Thomas C. Lagaly

[57] ABSTRACT

A package which allows for butchering and packaging of a fresh red meat product at a centralized facility is provided. The package includes a support member which contains the product; a first, preferably permeable film sealed to the support member for enclosing the product; a second, preferably impermeable film enclosing the first film and removably secured to the package; and labeling means including a label removably affixed to an outer surface of the support member. Upon removal of the second film, the label may be removed from the outer surface of the support member and adhered to the first film, thereby providing a package labeled with individualized information relating to the particular product.

20 Claims, 4 Drawing Sheets

DUAL WEB PACKAGE HAVING LABELING MEANS

BACKGROUND OF THE INVENTION

The present invention relates generally to packages for fresh red meat. Particularly, this invention is directed to the packaging of food products such that the packaged product may be maintained in one condition under certain circumstances and then converted to another condition. Specifically, packages in accordance with the present invention provide for distribution of a packaged product in a low oxygen environment and for introduction of oxygen to the product surface at a supermarket or other retail outlet. Such introduction of oxygen is achieved either by permeation of oxygen through a film in contact with the product surface or through an exchange with a low oxygen gaseous atmosphere contained around the product.

While a wide variety of food products can be packaged in accordance with the teachings of this invention, it is particularly advantageous in connection with the packaging of fresh red meat such that the meat may be transported in a low oxygen atmosphere, that is, preferably 0.5% $O_2$ or less, most preferably 0.05% $O_2$ or less, and then caused to bloom when it reaches a supermarket by exposure to oxygen.

Historically, large sub-primal cuts of meat have been butchered and packaged in each supermarket. This, however, can be somewhat inefficient and result in certain undesirable additional costs. For example, all cuts from a large sub-primal must be sold at once. Instead it would be preferable to permit the meat to be butchered and packaged at a central facility which benefits from economies of scale and thereafter shipped to individual supermarkets to be merchandised one retail cut at a time.

In the past, the goal of central fresh red meat processing has not been achievable because most consumers prefer to buy meat which is reddened in color as a result of exposure to oxygen. However, the meat maintains its reddened color for approximately one to three days and, thereafter, turns a brown color which is undesirable to most consumers. In an effort to maintain a reddened color, cuts of fresh red meat have been centrally packaged in high oxygen atmosphere packages. However, meat contained in such packages typically turns brown in ten to twelve days.

Therefore, if the meat was butchered and packaged in a gas permeable (hereinafter "permeable") film, as is typical at retail, at a central location and then shipped to another location for eventual sale, in all likelihood, by the time the package reached the retail outlet the meat would have undergone the transformation to the brown color and would be effectively unsalable. Conversely, if the meat was butchered and packaged at a central location in a gas-impermeable (hereinafter "impermeable") film, either under vacuum or with vacuum and a low oxygen gas flush, and then shipped to another location for eventual sale, the meat would reach the retail outlet having a purple color which is typical of meat prior to exposure to oxygen. Heretofore, marketing efforts to teach the consumer about the harmlessness of the purple color have proved to be difficult. And, if the gas impermeable film was a component of a conventional package having a tray which is overwrapped or lidded with a film and which contains a low oxygen atmosphere, the impermeable film would have to be removed and replaced with a permeable film in order to allow for bloom of the meat to a bright red color prior to display for the consumer, negating to a large extent the benefits of a central processing facility.

A variety of packages have been developed in an effort to provide a means for transporting meat in a low oxygen environment and for quickly and easily introducing oxygen to the meat at the retail outlet immediately prior to display to the consumer.

One approach to solving this problem has involved the development of peelable films. That is, films have been developed which readily delaminate into permeable and impermeable portions. Such a film is sealed to a support member, such as a tray, which contains the meat product, thereby forming a gas impermeable package for distribution. At the retail outlet, the gas impermeable portions are peeled from the film leaving a permeable film sealed to the tray and, therefore, a gas permeable package which allows the meat to bloom to bright red because of the exchange with atmospheric oxygen.

The peelable film may extend over the contained product and be sealed to the periphery of the tray as a lid or it may be heated and draped over the product under vacuum to form to a vacuum skin package. The permeable portion of the peelable film generally has a much higher gas transmission rate than that of the entire film prior to delamination, e.g., 5,000 to 25,000 cc/m$^2$/24 hrs./atm. at 73° F. as compared to 0 to 50 cc/m$^2$/24 hrs./atm. at 73° F. prior to delamination.

Most of the other approaches to achieving the goal of central fresh red meat processing have involved the development of a variety of dual web packages of the type having a permeable film covering the meat product and an impermeable film, which is removed at the retail outlet, covering the permeable film wherein the permeable film and the impermeable film are separate, discreet films.

Examples of these types of packages include dual overwrap packages wherein a permeable film is wrapped around the meat and its support member and an impermeable film is wrapped about the permeable film; dual lid packages which include a permeable lid and an impermeable lid sealed to the periphery of the support member; and packages with a head space which allows for the introduction of a treating gas, typically nitrogen, carbon dioxide or some mixture of the two, between a permeable film adjacent to the meat product and an impermeable upper web. Typical gas transmission rates for the gas permeable films in such dual web packages range from about 5,000 to 25,000 cc/m$^2$/24 hrs./atm. at 73° F.

Unfortunately, for dual web or peelable film packages as discussed above, any information such as weight and pricing contained on a label affixed to the permeable web following removal of the impermeable web must currently be procured at the retail facility. That is, central labeling for dual web packages has not been feasible because the packaging machinery typically applies the permeable film and the impermeable film simultaneously. Applying the permeable film, stopping to weigh the package, and applying an individualized label to the permeable film prior to applying the impermeable film would significantly increase packaging costs. For peelable films where the permeable web and impermeable web are coextruded, interjection of a label between the two webs would be impossible. Labels applied to the side walls or bottom surface of the support tray are not attractive to consumers who are accustomed to labeling on the upper surface of products. Thus, while packages of the type discussed above have obviated the need for in-store butchering, retail workers are still required to weigh each individual package and to create a unique label for each package.

Thus, it is an object of the present invention to provide a package which allows for central processing of fresh red meat with minimal processing required at retail.

It is yet another object of the present invention to provide a package which is similar in appearance to that which consumers are accustomed to seeing for meat packaging.

It is yet another object of the present invention to provide a package which may be assembled, filled, sealed, weighed and labeled at a central processing facility on conventional equipment.

SUMMARY OF THE INVENTION

These as well as other objects are achieved by providing a package for a product, comprising:

- a support member for supporting and containing a product, the support member having sidewalls and a base defining an inner surface and an outer surface, the product being contained within the inner surface;
- a first, preferably permeable film sealed to the support member for enclosing the product within the inner surface of the support member;
- a second, preferably impermeable film enclosing the first film and being removably secured to the package, i.e., removably secured to either the support member or the first film; and
- labeling means which includes a label removably affixed to the outer surface of the support member.

The first film is preferably more permeable to oxygen than the second film such that removal of the second film allows atmospheric oxygen to enter the package via the first film.

The objects of the invention are further achieved by providing a method for providing a packaged product comprising the steps of:

a) packaging the product by a method comprising the steps of:
  i) providing an impermeable support member for supporting and containing the product, the support member having sidewalls and a base defining an inner surface and an outer surface;
  ii) positioning the product within the inner surface of the support member;
  iii) sealing a first, permeable film to the support member for enclosing the product within the inner surface of the support member; and
  iv) enclosing the first film with a second, impermeable film;
b) providing labeling means comprising a label capable of adhering to the first permeable film and comprising printed information individualized to the product;
c) adhering the labeling means to the outer surface of the support member such that the label is removable therefrom;
d) distributing the package to a retail facility;
e) removing the second, impermeable film such that gases are exchanged into and out of the package via the first, permeable film;
f) removing the label from the outer surface of the support member; and
g) adhering the label to the first, permeable film.

BRIEF DESCRIPTION OF THE DRAWINGS

A detailed description of preferred embodiments of the invention follows, with reference to the accompanying drawings, wherein.

DETAILED DESCRIPTION OF THE PREFERRED EMBODIMENTS

Figure 1:
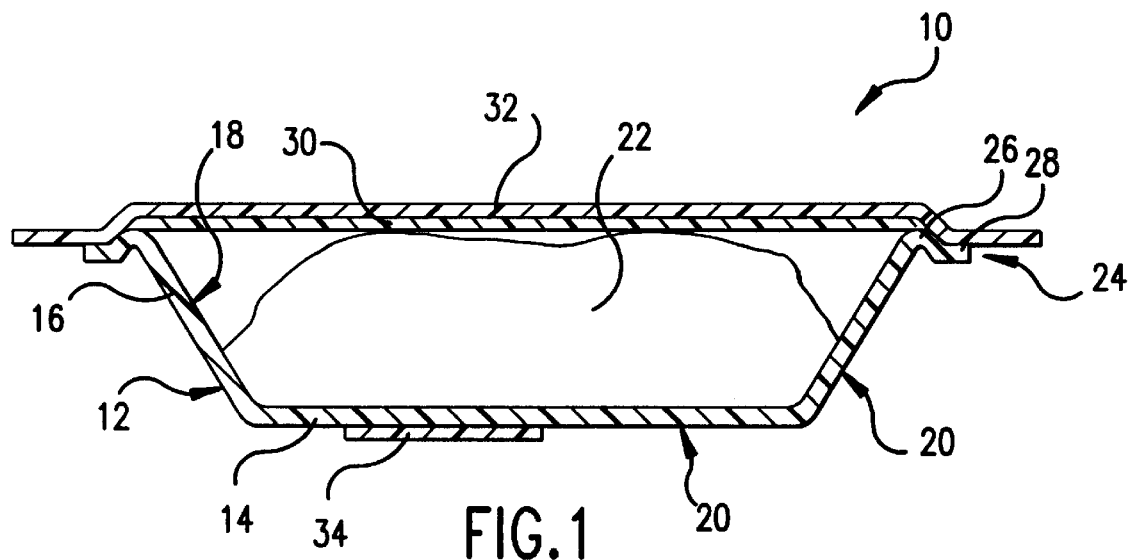
FIG. 1 is a cross-sectional view of a package according to the invention.

The present invention is directed to a tray-type package suitable for the central processing of fresh red meat which includes a gas impermeable (hereinafter "impermeable") support member or tray; a first, preferably permeable, film sealed to the tray; and a second, preferably impermeable, film which encloses the first film. The package most preferably contains a low oxygen gaseous atmosphere such as, for example, a nitrogen/carbon dioxide mix. Thus, removal of the impermeable film allows for a release of the low oxygen atmosphere and for introduction of oxygen to the packaged meat product.

The present invention is suitable for use with any dual web or peelable type package as described earlier herein, including all embodiments set forth in the following patents and patent applications, the disclosures of which are hereby incorporated by reference herein: U.S. Pat. Nos. 5,348,752 and 5,439,132; and U.S. Ser. Nos. 08/471,065 (now U.S. Pat. No. 5,686,126) 08/470,283, 08/470,802 (now U.S. Pat. No. 5,591,468) and 08/470,808, all of which patent applications were filed on Jun. 6, 1995.

As used herein, the term "permeable" refers to films which have a gas (e.g., oxygen) transmission rate of at least about 1,000 cc/m$^2$/24 hrs./atm. at 73° F., more preferably at least about 5,000 cc/m$^2$/24 hrs./atm. at 73° F., even more preferably at least about 10,000 cc/m$^2$/24 hrs./atm. at 73° F., more preferably still at least about 50,000 cc/m$^2$/24 hrs./atm. at 73° F., and most preferably at least about 100,000 cc/m$^2$/24 hrs./atm. at 73° F. This gas (oxygen) permeability is desirable so that, when the impermeable film is peeled from the package, oxygen can quickly permeate the permeable film and oxygenate the fresh red meat product to provide the desirable bright red "bloom" associated by the consumer with freshness. The term "permeable" also refers to films which do not have such a high gas permeability, but which are sufficiently permeable to effect a sufficiently rapid bloom for the particular product and particular end-use application; films which have been altered to increase the gas transmissibility; and films which are the underlying film in a package which has been modified to compensate for insufficient permeability in the underlying film.

As used herein, the term "impermeable" refers to films and support members which preferably have a gas (e.g., oxygen) permeability of less than or equal to about 500 $cc/m^2/24$ hrs./atm. at 73° F. cc, more preferably less than about 100 $cc/m^2/24$ hrs./atm. at 73° F., more preferably still less than about 50 $cc/m^2/24$ hrs./atm. at 73° F., and most preferably less than about 25 $cc/m^2/24$ hrs./atm. at 73° F.

The support member of the package generally includes a base and sidewalls such that an inner surface may be defined as including the interior surfaces of the sidewalls and the upper surface of the base and an outer surface may be defined as including the exterior surfaces of the sidewalls and the lower surface of the base. The support member will also typically include a flange to which at least one and preferably both of the films are sealed. A variety of flange configurations are possible as is discussed in greater detail below.

In accordance with the present invention, a labeling means is affixed to the outer surface of the support member. In one embodiment, the labeling means is a label which is removably adhered to the outer surface of the support member. Upon removal of the impermeable film from the package, the label may be removed, preferably by peeling, from the outer surface of the support member and adhered to the exposed permeable film. The label includes printed information which is unique to the package product. Preferably, the label includes specific weight and pricing information. Thus, the product is packaged and provided with an individualized label at the central processing facility. At retail the impermeable film is removed and the label is moved from the outer surface of the support member to the permeable film. The present package not only eliminates the need for retail butchering but also avoids weighing and label production at retail.

Looking specifically to the Figures of the drawing it should be noted that like reference numbers are indicative of like elements. Thus, FIG. 1 is a cross-sectional view of a package 10 in accordance with the present invention. Support member 12 includes base 14 and sidewalls 16. Inner surface 18 of the support member is comprised of the interior surfaces of the sidewalls and the upper surface of the base. Outer surface 20 of the support member is comprised of the exterior surfaces of the sidewalls and the lower surface of the base. Product 22 is contained within the inner surface of the support member. The support member also includes flange 24. The preferred, stepped flange structure is illustrated which includes upper, inner flange surface 26 and lower, outer flange surface 28. A permeable film 30, such as discussed above, encloses the product and is sealed to the flange at surface 26. Impermeable film 32 encloses the permeable film and is sealed to the flange at surface 28. Label 34 is removably adhered to the outer surface 20 of the support member.

Figure 2:
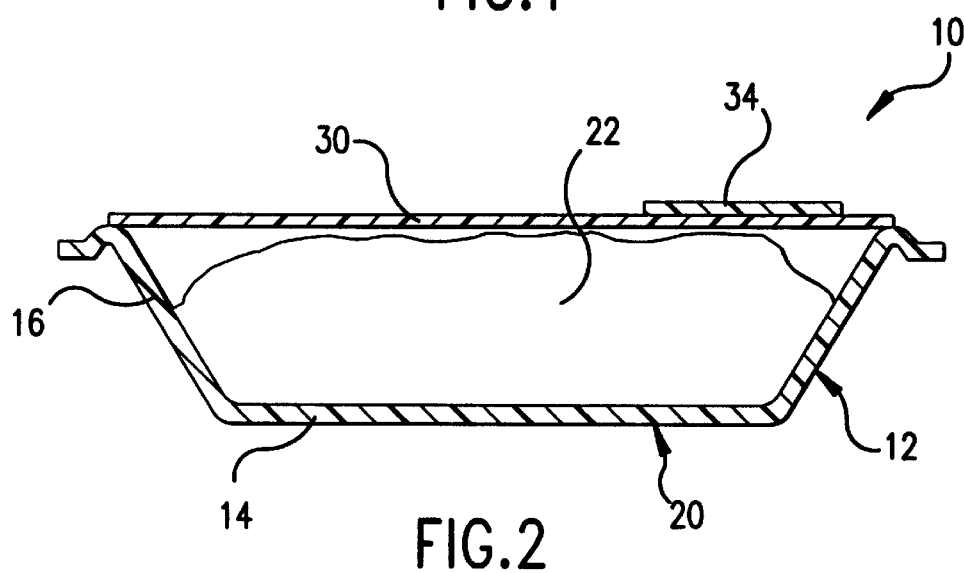
FIG. 2 is a cross-sectional view of a package of FIG. 1 following removal of the impermeable film and application of the label to the permeable film.

FIG. 2 illustrates package 10 subsequent to the removal of impermeable film 32 at retail. Label 34 has been removed from the outer surface 20 of the support member and adhered to permeable film 30 for display.

Figure 3:
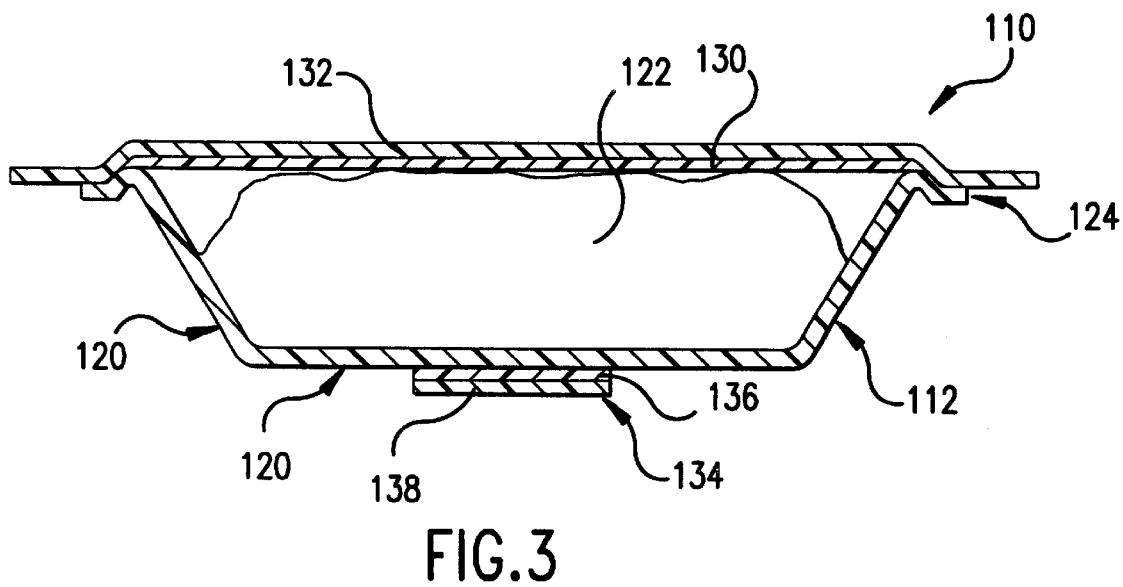
FIG. 3 is a cross-sectional view of another embodiment of the package of the present invention.
Figure 4:
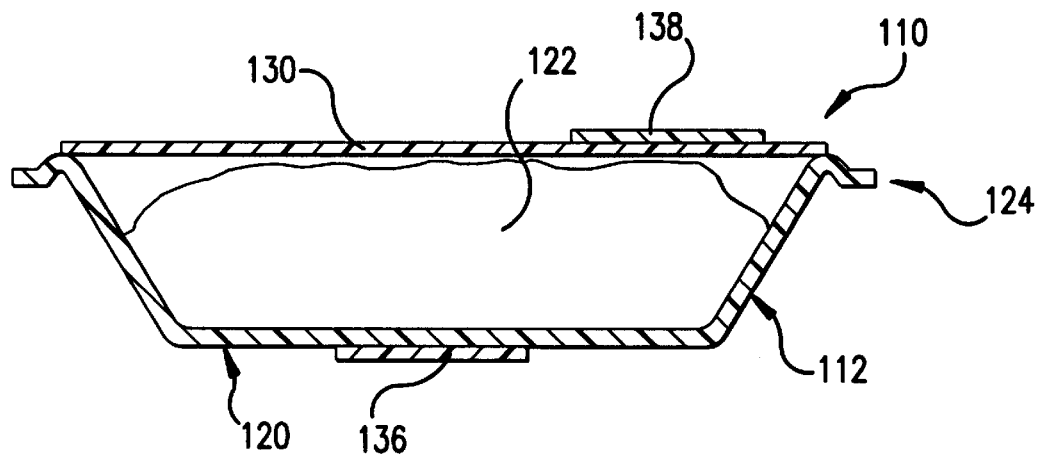
FIG. 4 is a cross-sectional view of the package of FIG. 3 following removal of the impermeable film and application of the label to the permeable film.

In alternative embodiments the labeling means is a structure which includes a removable label and, upon removal of the label, the remainder of the labeling means remains affixed to the outer surface of the support member. In one of such embodiments the labeling means comprises a multilayer structure as is shown in FIG. 3. Labeling means 134 is adhered to the outer surface 120 of support member 112. The labeling means comprises substrate 136 and removable label 138. Upon removal of impermeable film 132 label 138 is peeled from substrate 136 and adhered to permeable film 130 as is shown in FIG. 4. Substrate 136 may also contain printed information.

Figure 5:
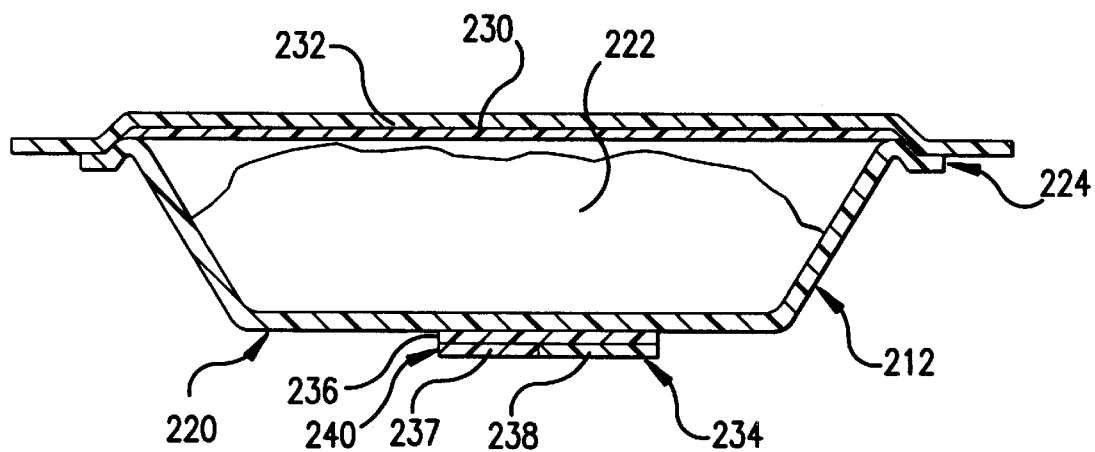
FIG. 5 is a cross-sectional view of yet another embodiment of the package of the present invention.
Figure 6:
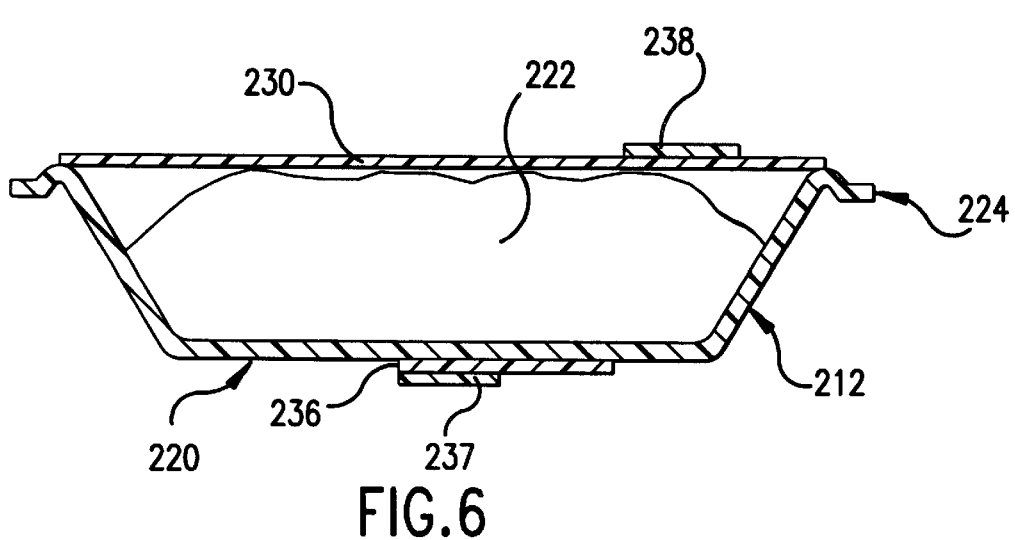
FIG. 6 is a cross-sectional view of the package of FIG. 5 following removal of the impermeable film and application of the label to the permeable film.

In accordance with another embodiment of the present invention, the label may be die cut such that the label and the remaining portion are separate but contiguous as is shown in FIG. 5. In this manner, one portion may be removed from the substrate and placed on the permeable film and the remaining portion may remain on the substrate as shown in FIG. 6. For such embodiment, labeling means 234 includes substrate 236, label 238 and portion 237 which remains adhered to the substrate following removal of the label. The remaining portion 237 may be imprinted with the same or similar information as contained on the removed label 238 in order to verify that the proper label has been adhered to the permeable film of the appropriate package at retail. FIG. 6 illustrates the package of FIG. 5 following removal of impermeable film 232 and application of label 238 to permeable film 230.

Figure 7:
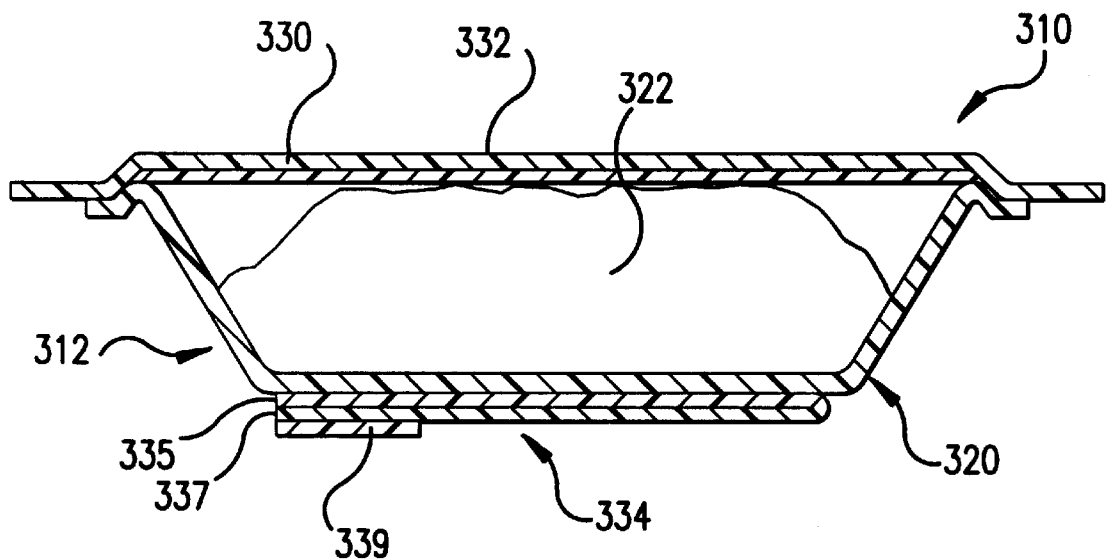
FIG. 7 is a cross-sectional view of another package in accordance with the present invention.
Figure 8:
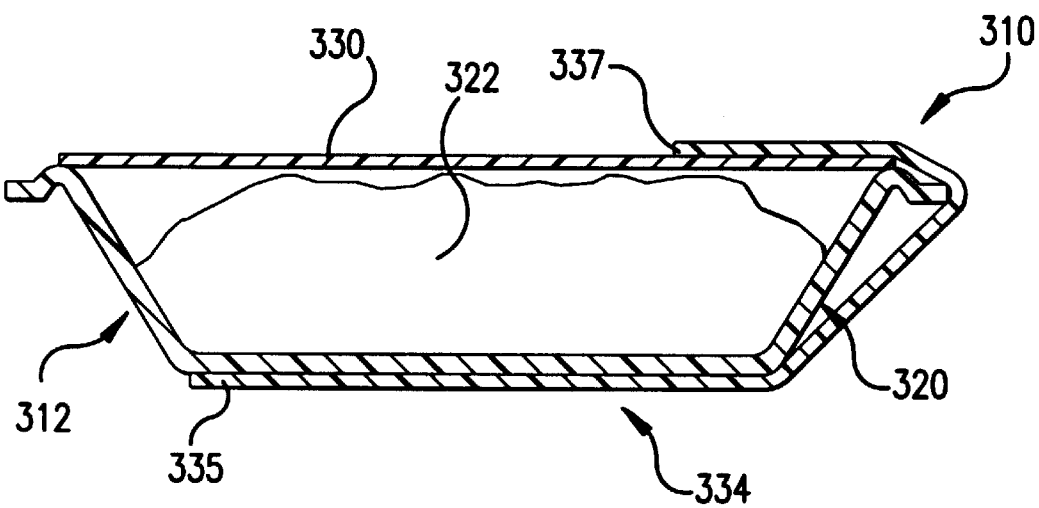
FIG. 8 is a cross-sectional view of the package of FIG. 7 following removal of the impermeable film and extension of the elongated band label across and onto the permeable film.

In yet another embodiment, the labeling means is an elongated band as shown in FIG. 7. Elongated band 334 is adhered to the outer surface 320 of support member 312 at a first end 335 thereof. The second, opposite end 337 of elongated band 334 is removably adhered to the first end 335 on one side thereof, and includes a protective peel layer 339 on the other side thereof. Upon removal of impermeable film 332, the second end 337 is peeled from the first end 335 of the band 334, and protective peel layer 339 is removed to reveal an underlying adhesive. The band is then wrapped around the package and adhered to permeable film 330 as is shown in FIG. 8. Alternatively, the band may wrap completely across the top of the package and adhere to the outer surface of the support member or to the band itself. As a further variation, the band may be accordioned rather than merely folded back on itself. Regardless of the specific design employed, a key advantage of an elongated band as the labeling means for the package is the opportunity for coupons, recipes and other marketing information to be provided to the consumer in addition to the basic price and weight information of a smaller label.

If desired, the permeable film may be modified to increase its gas transmissibility. A preferred means for achieving such is to provide an enlarged opening in the permeable film as is shown in the cross-sectional view of FIG. 9. Although such opening may be formed at retail it is preferably done at the central packaging facility as a part of the packaging process. The impermeable film 432, which encloses and is preferably immediately adjacent to the permeable film 430, prevents contamination of the product 422 and flow of juices such as meat purge from the package during transit. Upon removal of the impermeable film at retail, the flow of gases through the enlarged opening 431 allows for a rapid and immediate bloom of the fresh red meat product.

Figure 10:
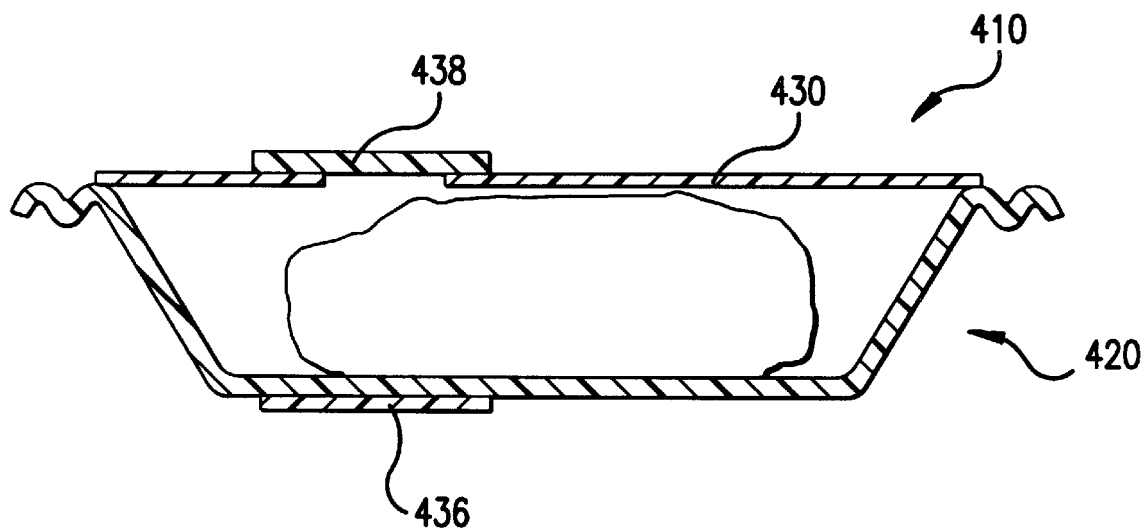
FIG. 10 is a cross-sectional view of the package of FIG. 9 following removal of the impermeable film and application of the label to the permeable film and over the enlarged opening defined within the permeable film.

In accordance with the present invention, labeling means, such as labeling means 434, are also provided. Following bloom, the enlarged opening 431 may be covered with label 438 which has been removed from substrate 436 as shown in FIG. 10.

Figure 9:
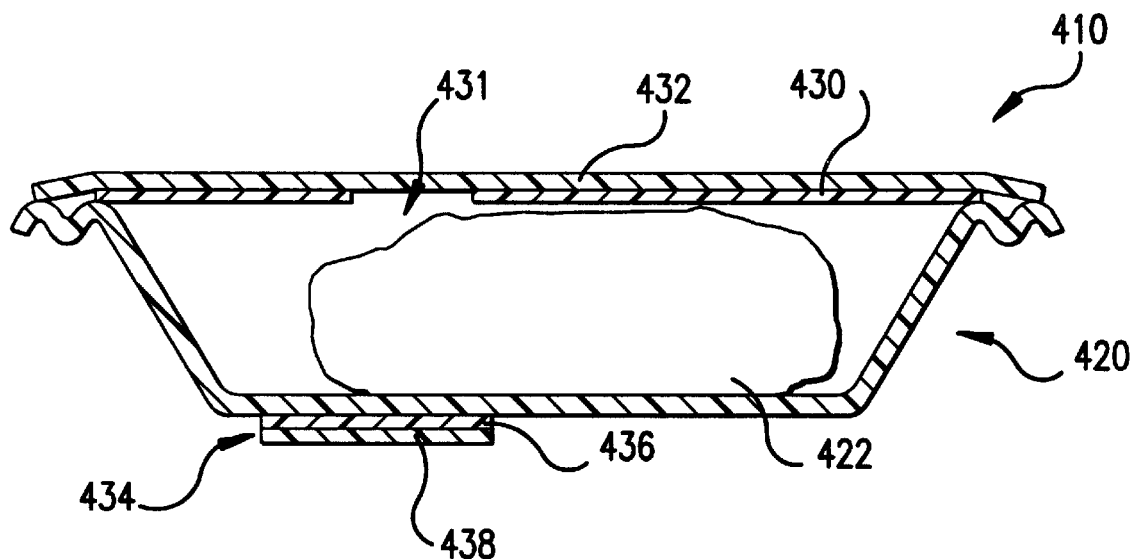
FIG. 9 is a cross-sectional view of yet another package in accordance with the present invention.

For all embodiments of the present invention, the support member can be a tray having any desired configuration or shape, e.g., rectangular, round, oval, etc. Similarly, the flange may have any desired shape or design, including a simple, substantially flat design which presents a single sealing surface, or a more elaborate configuration which presents two or more sealing surfaces, such as the dual-flange configurations shown in the drawings. In general, a dual-flange configuration is preferred whenever two separate webs are to be sealed to a single support member. Preferred dual-flange configurations include the "stepped" flange shown in FIGS. 1–8, or a flange of the type having coplanar flange portions separated by a depression as shown in FIGS. 9–10.

A conventional, single-flange support member may be employed when a precise means are available for sealing the first film to an inner portion of the single flange and for subsequently sealing the impermeable film to an outer portion of the single flange. That is, the primary reason a dual-flange tray is preferred for use as the support member of the present invention is that it facilities the automated sealing of two separate webs to the flange. A second circumstance under which a single-flange tray may be employed is when an adequate, peelable seal may be made between the impermeable film and the first film. Rather than sealing the impermeable film directly to the outer tray, it is possible, with the proper selection of film components, to form a seal directly to the first film which may be peeled away without disturbing the seal between the first film and the tray flange. As a variation, the permeable and the impermeable films may be separable webs of a single multilayer film such that a single flange tray would be appropriate. An example of such would be a peelable vacuum skin packaging (VSP) package wherein a multilayer, delaminatable film is heated and draped under vacuum over the product. Such VSP packages, which are appropriate for use in accordance with the present invention, typically do not require a flanged support member because the film seals to the inner surface of the support member about the product. The impermeable film, as defined herein, is the portion of the multilayer film which contains the barrier layer. Following delamination of the barrier portion, the label on the outer surface of the tray may be transferred to the permeable portion.

Suitable materials from which the support member can be formed include, without limitation, polyvinyl chloride, polyethylene terephthalate, polystyrene, polyolefins such as high density polyethylene or polypropylene, paper pulp, nylon, polyurethane etc. The support member may be foamed or non-foamed as desired, and preferably provides a barrier to the passage of oxygen therethrough, particularly when the product to be packaged is perishable or degradable in the presence of oxygen, such as fresh red meat products (e.g., beef, veal, lamb, pork, etc.), poultry, fish, cheese, fruits, or vegetables. In this regard, the support member preferably has a gas (oxygen) permeability of less than or equal to about 500 cc/m$^2$/24 hrs./atm. at 73° F., more preferably less than about 100 cc/m$^2$/24 hrs./atm. at 73° F., more preferably still less than about 50 cc/m$^2$/24 hrs./atm. at 73° F., and most preferably less than about 25 cc/m$^2$/24 hrs./atm. at 73° F.

The support member may be formed from a material which provides a barrier to the passage of oxygen, e.g., vinylidene chloride copolymer, nylon, polyethylene terephthalate, ethylene/vinyl alcohol copolymer, etc. Alternatively, the support member may have an oxygen-barrier film laminated or otherwise attached to the inner or outer surface thereof, as disclosed in U.S. Pat. No. 4,847,148 and in U.S. Ser. No. 08/326,176, filed Oct. 19, 1994 and entitled "Film/Substrate Composite Material," the disclosures of which are hereby incorporated herein by reference. The laminated film preferably includes an oxygen-barrier material such as e.g., vinylidene chloride copolymer, nylon, polyethylene terephthalate, ethylene/vinyl alcohol copolymer, etc.

The permeable film may be thermoformable or, more preferably, stretchable, e.g., stretch-oriented and heat-shrinkable, and may be formed from any material having sufficient oxygen permeability (as described below) and which may be securely sealed and bonded to the support member. Examples include such materials as, e.g., ethylene/vinyl acetate copolymer (EVA), ethylene/butyl acrylate copolymer, polyethylene homopolymer and copolymers such as ethylene/alpha-olefin copolymers, ionomers, etc. The ethylene/alpha-olefin copolymer may be either heterogeneous or homogeneous. That is, ethylene/alpha-olefins formed by conventional Zeigler-Natta catalysis are heterogeneous copolymers such as, e.g., linear low density polyethylene (LLDPE), whereas single-site catalyzed copolymers such as those formed via metallocene catalyst technology are homogeneous in nature, all of which are within the scope of the invention. Further, the support member may be a single or multilayer film having other layers for other desired purposes such as, e.g., abuse-resistance, heat-sealability, optical properties, strength, improved oxygen-permeability, etc. In the case of a multi-layer film, any suitable technique for making film may be employed such as, e.g., coextrusion, lamination, extrusion coating, etc. An exemplary film structure for web 24 is EVA/LLDPE/EVA/LLDPE/EVA. Such film is preferably coextruded and stretch-oriented. The film may also be cross-linked through electronic or chemical means.

The permeable film preferably has an oxygen transmission rate of at least about 1,000 cc/m$^2$/24 hrs./atm. at 73° F., more preferably at least about 5,000 cc/m$^2$/24 hrs./atm. at 73° F., even more preferably at least about 10,000 cc/m$^2$/24 hrs./atm. at 73° F., more preferably still at least about 50,000 cc/m$^2$/24 hrs./atm. at 73° F., and most preferably at least about 100,000 cc/m$^2$/24 hrs./atm. at 73° F.

In addition to or instead of being inherently permeable, the permeable film can be perforated with very small holes and/or can have one or more larger holes over which is applied a "patch" of a material which has a very high degree of permeability to the passage of oxygen (e.g., a microporous material such as spun-bonded polyolefin or polyester materials, e.g., Tyvek™ from DuPont). The number and/or size of such holes can be selected to achieve any desired level of oxygen permeability.

The impermeable film may be any suitable coextruded or laminate film which is substantially impermeable to oxygen (as described below) so that a fresh red meat product packaged in a vacuum or low oxygen atmosphere possesses an enhanced shelf-life over a package without an oxygen-impermeable lid. The impermeable film may be thermoformable or stretch-oriented, and may likewise be a single or multi-layer film having other layers for other purposes as desired.

The impermeable film is preferably substantially impermeable to gas, especially oxygen, and preferably has an oxygen permeability of less than or equal to about 500 cc/m$^2$/24 hrs./atm. at 73° F. cc, more preferably less than about 100 cc/m$^2$/24 hrs./atm. at 73° F., more preferably still less than about 50 cc/m$^2$/24 hrs./atm. at 73° F., and most preferably less than about 25 cc/m$^2$/24 hrs./atm. at 73° F.

Suitable materials from which the impermeable film may be formed include one or more layers of, e.g., ethylene/vinyl alcohol copolymer (EVOH), vinylidene chloride copolymer (saran), polyesters and copolyesters, polyamides and copolyamides, polyvinyl alcohol, polyhydroxyaminoether, polyalkylene carbonate, blends of the foregoing materials, and other oxygen-barrier materials which are well known in the art. An exemplary film structure for the impermeable film is polyamide/tie/polyamide/EVOH /polyamide/tie/LLDPE/LLDPE and/or EVA (where "tie" is a tie or adhesive layer). Such film is preferably cast-coextruded. An alternative film structure is a saran-coated, biaxially-oriented polyamide film adhesively laminated to the following coextruded film: EVA/LLDPE/PE and/or PP and/or EVA.

The labeling means of the present invention may be gas permeable or gas impermeable and may be formed of plastic, paper or any other suitable printable material or a combination of materials for multilayer structures.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A package for a product, comprising:
    a support member for supporting and containing a product, the support member having sidewalls and a base defining an inner surface and an outer surface, the product being contained within the inner surface;
    a first film sealed to the support member for enclosing the product within the inner surface of the support member;
    a second film enclosing the first film and being removably secured to the package; and
    labeling means comprising a label removably affixed to the outer surface of the support member such that at least a portion of the label is capable of being removed from the support member and adhered to the first film after the second film is removed from the package.

2. The package set forth in claim 1 wherein said labeling means comprises a label having printed information visible on one side thereof and an adhesive on the other side thereof, the adhesive removably adhering the label to the outer surface of the support member and capable of adhering the label to the first film.

3. The package set forth in claim 1 wherein said labeling means comprises a multilayer structure comprising a substrate and a label removably adhered to the substrate.

4. The package set forth in claim 3 wherein the label comprises an adhesive on one side thereof removably adhering the label to the substrate and capable of adhering the label to the first film.

5. The package set forth in claim 3 wherein the substrate comprises an adhesive on one side thereof adhering the substrate to the outer surface of the support member.

6. The package set forth in claim 5 wherein the substrate further comprises printed information.

7. The package set forth in claim 1 wherein said labeling means comprises an elongated band having a first end and a second end, the first end being adhered to the outer surface of the support member and the second end being capable of adhering to the first film.

8. The package set forth in claim 7 wherein the second end of the elongated band capable of adhering to the first film is removably adhered to the first end of the elongated band.

9. The package set forth in claim 1 wherein the first film includes an opening capable of being covered and enclosed by the label.

10. The package set forth in claim 1 wherein the label is gas impermeable.

11. The package set forth in claim 1 wherein the label is gas permeable.

12. The package set forth in claim 1 wherein the first film is permeable and the second film is substantially impermeable such that removal of the second, impermeable film provides for the exchange of gases into and out of the package via the first, permeable film.

13. The package set forth in claim 1 wherein the first film is more permeable to oxygen than the second film such that removal of the second film allows atmospheric oxygen to enter the package via the first film.

14. The package set forth in claim 1 wherein the support member is substantially impermeable.

15. A method for providing a packaged product comprising the steps of:
    a) packaging the product by a method comprising the steps of:
        i) providing an impermeable support member for supporting and containing the product, the support member having sidewalls and a base defining an inner surface and an outer surface;
        ii) positioning the product within the inner surface of the support member;
        iii) sealing a first, permeable film to the support member for enclosing the product within the inner surface of the support member; and
        iv) enclosing the first film with a second, impermeable film;
    b) providing labeling means comprising a label capable of adhering to the first permeable film and comprising printed information individualized to the product;
    c) adhering the labeling means to the outer surface of the support member such that the label is removable therefrom;
    d) distributing the package to a retail facility;
    e) removing the second, impermeable film such that gases are exchanged into and out of the package via the first, permeable film;
    f) removing the label from the outer surface of the support member; and
    g) adhering the label to the first, permeable film.

16. The method set forth in claim 15 further including, subsequent to packaging the product and prior to providing the labeling means, the step of weighing the package and wherein the printed information provided on the label is individualized to the weight of the product.

17. A package for a product, comprising:
    a support member for supporting and containing a product, the support member having sidewalls and a base defining an inner surface and an outer surface, the product being contained within the inner surface;
    a multilayer film sealed to the support member for enclosing the product within the inner surface of the support member, said film capable of delamination into a gas-permeable portion and a gas-impermeable portion; and
    labeling means comprising a label removably affixed to the outer surface of the support member such that at least a portion of said label is capable of being removed from said support member and adhered to the gas-permeable portion of said film following the removal of said gas-impermeable portion.

18. The package set forth in claim 17 wherein said labeling means comprises a label having printed information visible on one side thereof and an adhesive on the other side thereof, the adhesive removably adhering the label to the outer surface of the support member and capable of adhering the label to the gas-permeable portion of said film.

19. The package set forth in claim 17 wherein said labeling means comprises an elongated band having a first end and a second end, the first end being adhered to the outer surface of the support member and the second end being capable of adhering to the gas-permeable portion of said film.

20. The package set forth in claim 17 wherein the gas-permeable portion of said film includes an opening capable of being covered and enclosed by the label.

\* \* \* \* \*